Figures 1, 2:
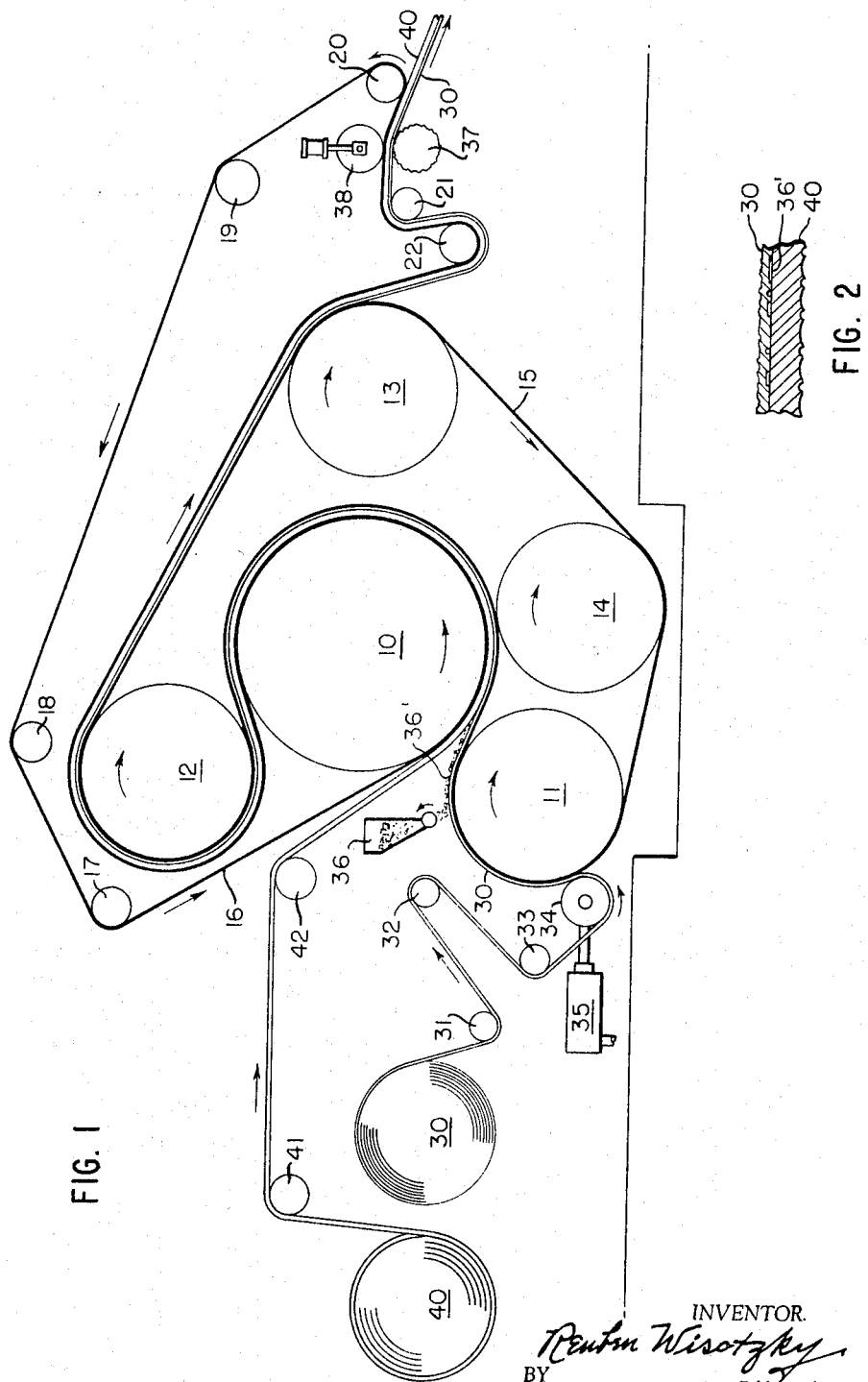

Oct. 18, 1966 R. WISOTZKY 3,279,968
PROCESS FOR MAKING DECORATIVE COVERINGS
Filed Aug. 16, 1962

INVENTOR.
Reuben Wisotzky
BY
Kenway, Jenney & Hildreth
Att'ys.

United States Patent Office 3,279,968
Patented Oct. 18, 1966

3,279,968
PROCESS FOR MAKING DECORATIVE
COVERINGS
Reuben Wisotzky, Lexington, Mass., assignor to American
Biltrite Rubber Co., Inc., Chelsea, Mass., a corporation
of Delaware
Filed Aug. 16, 1962, Ser. No. 217,499
2 Claims. (Cl. 156—209)

This invention comprises a new, improved and continuous process of making decorative flooring and wall coverings from elastomeric materials with which are incorporated granules, fiber particles, metallic confetti and other particulate and colored bodies which are herein for convenience termed ornamental fragments. The invention includes within its scope apparatus for the continuous production of such elastomeric coverings.

The decorative effects produced vary from mosaic, terrazo, grain and other conventional flat surface types to deeply embossed types with colored ornamentations which result from the ornamental fragments. Where light fragments such as thin flakes of colored plastic or metal have been used it has not heretofore been possible to lay out and maintain a uniform decorative pattern since a preheated and hence tacky backing tends to shrink or distort on account of molecular adjustment within the product. This difficulty has heretofore imposed severe limitations on the quality of the product as measured by uniformity and attractiveness and has greatly increased the cost of manufacture, while limiting the range of designs.

The difficulties above noted are obviated and important advantages achieved in accordane with the novel process of the present invention which is characterized by impressing a translucent film or vinyl compound upon a hot metallic band where the film is held by atmospheric pressure and tack in smooth stress-relief condition, distributing decorative fragments upon the exposed tacky surface of the film while so held and so stress relieved, covering the fragments with a thermoplastic backing strip and then subjecting the components thus assembled to unifying and molding pressure. By this procedure the ornamental fragments are adhesively retained in the pattern of their distribution by the tacky surface of the film and there is no subsequent contraction or distortion of the stress-relieved film which destroys the pattern. The complete design is made permanent by the unifying and curing application of heat and pressure to which the components are subjected.

These and other features of the invention will be best understood and appreciated from the following description of apparatus of preferred form for carrying out the process as shown in the accompanying drawings in which:
 FIG. 1 is a diagrammatic view of the apparatus, and
 FIG. 2 is a fragmentary sectional view of the product.

As herein shown the process of my invention is carried out with the assistance of machinery of the well-known "Rotocure" type which includes in its structure a large heated drum 10, guide rolls 11, 12 and 13 and 14 and an endless steel pressure band 15. This is maintained under high tension and guided in a roughly triangular path which includes a substantially arcuate portion of the drum 10.

An endless textile band of impression duck 16 is directed by guide rolls 17, 18, 19, 20, 21 and 22 about a path partially encircling the drum 10 and the guide roll 12, and traveling beneath the pressure band 15 in its passage about the drum.

A continuous film of transparent or translucent vinyl compound 30 is drawn from a reel and directed over guide rolls 31, 32, 33 and 34 to the surface of the larger guide roll 11 which in turn leads to the drum 10. The roll 34 is continually urged against the circumference of the roll 11 by a hydraulic cylinder 35 and piston. The roll 11 is heated to 275–340° F. The film 30 is caused by the roll 34 to adhere smoothly to the smooth pressure band 15 in passing about a substantial portion of the circumference of the heated roll 11. In this passage all entrapped air is expelled from beneath the film 30 which now lies smoothly upon the heated band 15 being held therein by atmospheric pressure and tack for a period sufficient to completely relieve the film of internal stress.

Above the roll 11 is located a hopper 36 from which are distributed the ornamental fragments 36' upon the surface of the tacky and stress-relieved film 30 as it is advanced toward the bight of the pressure band 15 and drum 10 and while in stress relieved condition.

The fragments are held by the tacky surface of the film in the position in which they land upon the film from the hopper 36.

Thermoplastic backing material is drawn from a reel 40 and directed by guide rolls 41 and 42 to the drum 10 in position to cover the decorative fragments 36' as they arrive upon the film 30. The components thus assembled are then advanced about the drum 10 beneath the pressure band 15 and superposed upon the band 16 of the impression duck. The vinyl film 30, the decorative fragments 36' and the backing strip 40 are thus subjected to progressive continuous pressure and heat which unifies the components in an integral product, cures the material and imparts to the exposed surface of the backing ply 40 the surface texture of the impression duck.

The unified product after leaving the guide roll 13 is directed by the guide rolls 22 and 21 to an embossing roll 37 and a cooperating pressing roll 38 where the embossing roll acts to impart an embossed surface texture to the exposed face of the vinyl film 30.

It will be seen that up to this point the components have been carried by the band 16 of impression duck. After passing the embossing roll 37 the finished product is stripped from the guide roll 20 and may be reeled for shipment.

The sheet or film 30 may be of any suitable flexible thermoplastic compound such as plasticized vinyl chloride or polyethylene and this may be transparent, translucent or tinted as desired. The term "vinyl" is used generically herein. The backing strip 40 may be of any suitable thermoplastic compound of synthetic resin or the like and may be built up of several plies to substantial body thickness. This is indicated in FIG. 2 in which the translucent and embossed film 30 is shown as covering the ornamental fragment 36' and united to the underlying backing ply 40.

In practice it has been found desirable to heat the drum 10 to 250–375° F. and the roll 11 to a slightly less degree but sufficient to heat the pressure band 15 to a stress-relieving and slightly tacky condition before it arrives at the distribution point below the hopper 36. Thereafter the assembled components pass about considerably more than half the drum circumference while subjected to heat and severe molding and unifying pressure.

The squeeze roll 34 presses the film firmly against the steel pressure band during its arc of contact with the heated pressure guide roll 11. The pressure of roll 34 which may or may not be covered with a resilient surface layer, expels all air between the film and the band, so that the film is held in firm contact with the band, and in fact, due to the heating effect, adheres to the band. While adhered firmly to the band the film travels upward until it reaches the dispensing zone and where the particulate materials are dispensed so as to fall in contact with it and form a desired random pattern. The particles, once they come in contact with the heated film, tend to adhere to its tacky surface and since the film is held firmly in contact with the band, it does not distort the desired pattern which has been formed by the applied fragments.

The dispensing mechanism for the granules may be of any conventional type, for example, the hopper 36 is fitted with a driven mold which is surface-gluted so as to deliver the required volume of particulate material to the film.

The unified product is cooled as it leaves the guide roll 12 enclosed between the pressure band 15 and the textile carrying band 17. It is stripped from the pressure band 15 in passing the guide roll 13 so that the film 30 is exposed and after passing the guide rolls 22 and being reheated on roll 21 the film is subjected to the embossing action of the roll 37 under pressure of the rubber-coated roll 38. In practice these two rolls may be heated to a maximum of 210° F. or cooled to a minimum of 60° F. depending on the plasticity characteristics of the film employed, and then the product is cooled by cold water circulation on its way to wind-up mechanism. The molded product may then be cut into convenient shapes for tiling or panels.

Having thus disclosed my invention and described in detail illustrative embodiments thereof, I claim as new and desire to secure by Letters Patent:

1. The process of making thermoplastic coverings comprising the steps of smoothing, stress relieving and rendering tacky a film of translucent thermoplastic compound by causing it to adhere to a smooth hot band, depositing ornamental fragments upon the tacky surface of the film while thus adhered and stress relieved, applying a thermoplastic backing strip to the film enclosing said fragments, subjecting the said components to unifying and curing temperature and pressure while enclosed between the band on one side and a textile carrying strip on the other, stripping the product from said band to expose the film and embossing the film while the product is still carried by the textile carrying strip thereby imparting the woven pattern of the carrying strip to the thermoplastic backing.

2. The process of making decorative coverings, comprising the steps of impressing a translucent film of vinyl compound upon a heated metallic band where it is held by atmospheric pressure and tack in stress-relieved and tacky condition, distributing decorative fragments upon the tacky surface of the stress-relieved film while so held on the band, covering said fragments with a back strip of thermoplastic material, and then subjecting the components thus assembled to unifying and molding pressure while the backing strip is carried and supported during this unifying procedure by an endless band of impression textile fabric from which the textile pattern of the band is imparted to the backing strip.

References Cited by the Examiner
UNITED STATES PATENTS

| | | | |
|---|---|---|---|
| 1,886,928 | 11/1932 | Wyss | 156—390 |
| 2,434,541 | 1/1948 | Bierer | 156—324 |
| 2,617,750 | 11/1952 | LeClair et al. | 161—254 |
| 2,812,277 | 11/1954 | Hemming et al. | 156—209 |
| 2,986,198 | 5/1961 | Kolker et al. | 161—212 |
| 3,038,828 | 6/1962 | Yakubik | 161—119 |
| 3,121,642 | 2/1964 | Biskup | 156—248 |

EARL M. BERGERT, *Primary Examiner.*

R. I. SMITH, M. L. KATZ, *Assistant Examiners.*